July 2, 1968   J. W. FRENCH ET AL   3,390,413
GLASS WASHING APPARATUS
Filed Dec. 15, 1966
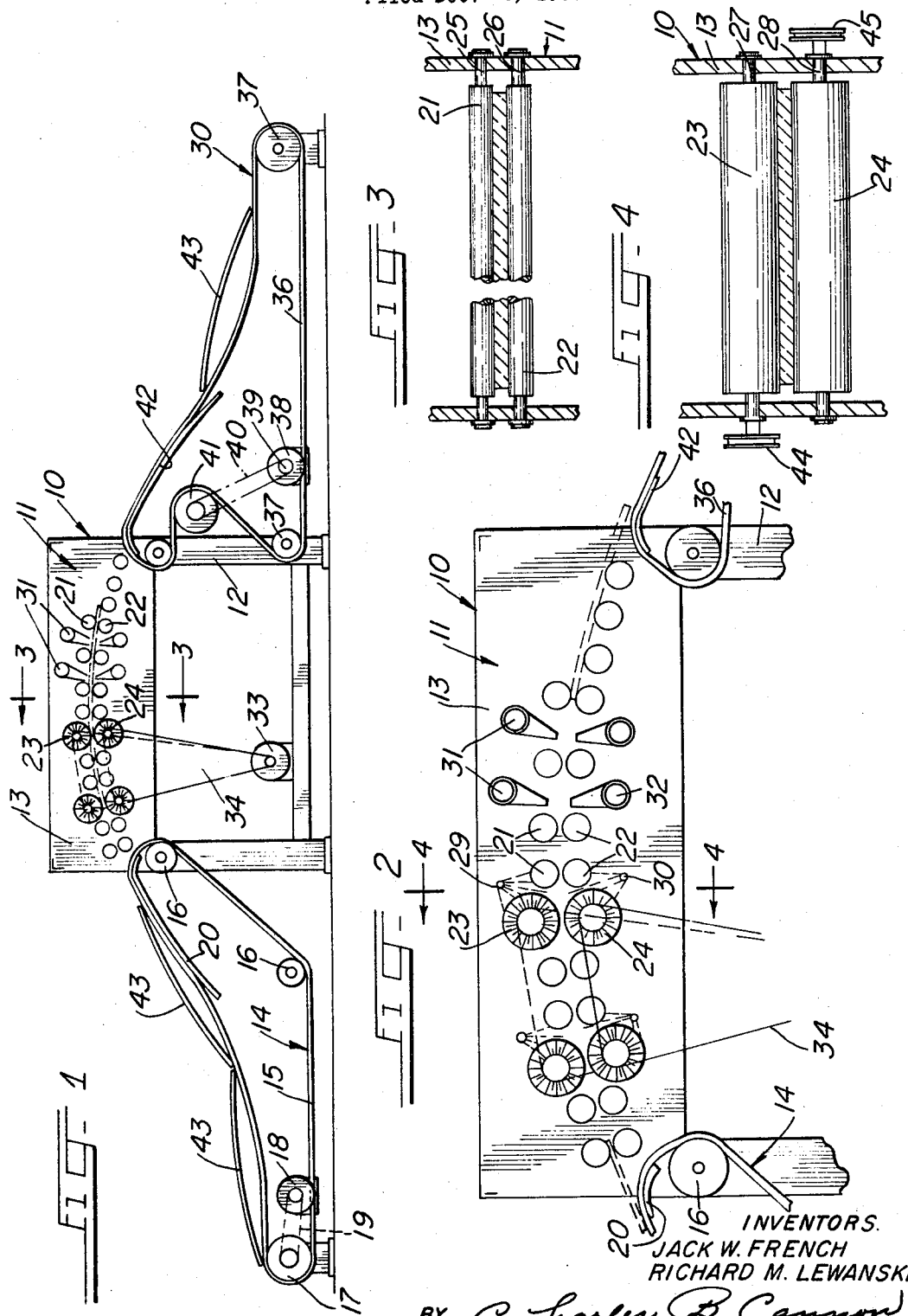
INVENTORS.
JACK W. FRENCH
RICHARD M. LEWANSKI
BY Charles B. Cannon
ATTY.

United States Patent Office 3,390,413
Patented July 2, 1968

3,390,413
GLASS WASHING APPARATUS
Jack W. French, Lake Forest, and Richard M. Lewanski, Chicago, Ill., assignors to Sommer & Maca Glass Machinery Company, Chicago, Ill., a corporation of Illinois
Filed Dec. 15, 1966, Ser. No. 601,921
6 Claims. (Cl. 15—77)

This invention relates to glass washing apparatus and, more particularly, to apparatus for washing curved glass shapes.

Heretofore, in the art, various forms of apparatus have been provided for washing flat sheet or plate glass. However, in recent years curved glass shapes have come into common use as safety glass for use in automotive vehicle windshields and door windows, and other forms of windows, and for other purposes, and prior glass washing apparatus for washing flat glass sheets has not been completely satisfactory for washing such curved glass shapes.

Accordingly, an object of the present invention is to provide a new and improved glass washing apparatus which is particularly adapted for use in washing curved glass shapes.

Another object of the invention is to provide a new and improved glass washing apparatus which is so designed and constructed that in use it will effectively wash curved glass shapes without substantial breakage of the curved glass shapes as they are advanced through the washing apparatus by the rubber advancing rolls or so-called pinch rolls and between the upper and lower banks of rotary brushes, especially since safety glass is tempered glass and more subject to breakage than the laminated glass heretofore used in the art for such purposes.

A further object of the invention is to provide a new and improved combination glass washing apparatus and conveyor units therefor which are particularly adapted for conveying curved glass shapes into the washing apparatus for conveying them therefrom after completion of the washing operation.

An additional object of the invention is to provide a glass washing apparatus which accomplishes more efficient cleaning and drying of curved glass sheets than has been possible heretofore with glass washing apparatus used for cleaning and drying curved glass shapes.

Another object of the present invention is to provide a new and improved apparatus for washing and drying curved glass shapes.

Other objects will appear hereinafter.

In the drawing:

FIG. 1 is a side elevational view of a glass washing apparatus and conveyor units therefor embodying the present invention;

FIG. 2 is a fragmentary elevational view illustrating the glass washing apparatus of the present invention;

FIG. 3 is a fragmentary transverse sectional view on line 3—3 in FIG. 1; and

FIG. 4 is a fragmentary transverse sectional view on line 4—4 in FIG. 2.

A typical embodiment of the new glass washing and drying apparatus and conveyor units therefor is illustrated in the drawing, wherein it is generally indicated at 10, and includes a central supporting frame 11 having upright frame supporting members 12 and a central upper horizontally extending frame member 13.

The new curved glass sheet washing and drying apparatus comprises a feed-in conveyor unit, which is generally indicated at 14, and includes an endless conveyor belt 15 which works around guide rolls 16, at the feed-in end of the glass washing apparatus 10. The feed-in conveyor unit 14 may be driven by any suitable power driving and power transmission means such, for example, as a drive roll 17 which is driven by suitable power means, and power transmission means, such as an electric motor unit 18 and belt 19 (FIG. 1). The feed-in conveyor unit 14 also includes a curved guide member or apron 20 which is suitably mounted on the supporting frame 11 at the feed-in end of the glass washing and drying apparatus 10 (FIGS. 1 and 2), and the upper run of the endless feed-in conveyor belt 15 works thereover (FIG. 1).

The new glass washing and drying apparatus 10 includes an upper bank of rubber advancing rolls, or so-called pinch rolls 21, and a lower bank of rubber advancing rolls 22; an upper bank of rotary cylindrical brushes 23; and a lower bank or rotary cylindrical brushes 24.

The upper bank or rubber advancing rolls 21 are mounted on shafts 25 which, in turn, are rotatably mounted in the supporting frame 11–13; the lower bank of advancing rolls 22 are mounted on similar shafts 26 which are rotatably mounted in the supporting frame 11–13; the upper bank of rotary brushes 23 are mounted on shafts 27 which are rotatably mounted in the supporting frame 11–13; and the lower bank of rotary brushes 24 are mounted on shafts 28 which are rotatably mounted in the supporting frame 11–13 (FIGS. 3 and 4).

Mounted adjacent each of the upper rotary brushes 23 is a water spray heat 29 and similar water spray heads 30 are mounted adjacent each of the lower rotary brushes 24.

Suitable air drying means, such as air drying tubes 31 are mounted on the supporting frame 11 between the upper rotary brushes 23 and the delivery end of the apparatus and air drying tubes 32 are mounted on the supporting frame between the lower rotary brushes 24 and the delivery end of the apparatus, relative to the direction of the curved glass shapes through the new curved glass washing and drying apparatus (left to right, FIGS. 1 and 2).

As best shown in FIG. 1, the rotary brushes 23 and 24 may be driven by any suitable power means and power transmission such, for example, as the motor unit 33, belt 34, and pulleys 44 and 45 which are attached to the shafts 27 and 28, respectively (FIG. 4).

A take-away or delivery conveyor unit, which is generally indicated at 35 in the drawing, is provided at the delivery end of the new glass washing and drying apparatus 10, and includes an endless take-away or delivery conveyor belt 36 which works around suitable guide rolls 37, and is driven by suitable power means, such as an electric motor unit 38, and power transmission means, such as the belt, pulley and drive roll unit 39–40–41.

It will be noted that the upper bank of rotary brushes 23, the upper bank of rubber advancing rolls 21, and their supporting shafts 25 and 27, respectively, and the lower bank of rotary brushes 24 and the lower bank of rubber advancing rolls 22 and their supporting shafts 26 and 28, respectively, and the upper and lower air drying tubes 31 and 32, respectively, are arranged in a curved or arcuate path, the radius of which corresponds, in general, to the radius of curvature of the curved glass shapes 43 which are fed through the new glass washing and drying apparatus 10.

A curved guide member or apron 42 is mounted on the supporting frame 11 at the delivery end of the new glass washing and drying apparatus 10, and the upper run of the endless takeaway or delivery conveyor belt 36 works thereover.

It will also be noted that the upper run of the endless feed-in conveyor belt 15, and the upper run of the take-away or delivery conveyor belt 36 are positioned, by the curved guide members or aprons 20 and 42, respectively, to travel in a curved path the radius of which corresponds generally to the radius of curvature of the curved glass shapes 43 and to the radius of curvature of the path of travel of the curved glass shapes 43 through the glass washing apparatus 10, as determined by the positioning of the upper and lower banks of rotary brushes 23–24 and the upper and lower banks or rubber advancing members 21–22, respectively.

In the practice of the present invention the curved glass shapes 43 are deposited on the upper run of the feed-in conveyor belt 15 by which they are fed, in the manner illustrated in FIG. 1, into the glass washing and drying apparatus 10 between the upper and lower banks of rubber advancing rolls 21–22 and between the upper and lower banks of rotary brushes 23–24, respectively, and as the curved glass shapes 43 travel through the apparatus they are washed by water from the spray heads 29–30 and are dried by the air from the air blower units 31–32, whereupon the thus washed and dried curved glass shapes 43 are delivered onto the upper run of take-away or delivery conveyor belt 36, as shown in FIG. 1.

It will be noted that when the curved glass shapes 42 are advanced through and between the upper and lower banks of advancing rolls 21 and 22, respectively, and between the upper and lower banks of rotary brushes 23 and 24, respectively, they are engaged thereby but are not subjected to such a degree of pressure as would cause them to fracture or be broken as would be the case if the upper and lower banks of rubber advancing rolls 21 and 22, respectively, and the upper and lower banks of rotary brushes 23 and 24, respectively, were arranged in a horizontal plane, as in prior art glass washing apparatus. In addition, better cleaning and drying are obtained in the use of the new glass washing apparatus due to uniform brush contact with the curved glass shapes and the rotary brushes 23 and 24 and the air drying tubes 31–32 are positioned at uniform distance from the curved glass shapes as they travel through the new glass washing apparatus due to the fact that rotary brushes 23–24 and the air drying tubes 31–32 are arranged in arcuate curved paths to radii of which correspond approximately to the radius of the arcuate or curved path of travel of the curved glass shapes through the glass washing apparatus.

Hence, in the use of the new curved glass washing and drying apparatus it is possible better to wash and dry tempered curved safety glass shapes, and like curved glass shapes, with a minimum of damage due to fracture and breakage, incidental to the pressure of the rubber advancing rolls 21–22 and the power driven rotary brushes 23–24, and in this manner an objectionable feature of the prior art glass washers, as used in washing curved glass shapes, is overcome.

It will thus be seen from the foregoing description, considered in conjunction with the accompanying drawing, that the present invention provides a new and improved glass washing and drying apparatus for washing and drying curved glass shapes, and thus has the desirable advantages and characteristics and accomplishes its intended objects including those hereinbefore pointed out and others which are inherent in the invention.

We claim:

1. Glass washing apparatus for washing curved glass shapes comprising
   (1) a feed-in end; and
   (2) a delivery end;
   (3) a supporting frame;
   (4) an upper bank of advancing rolls; and
   (5) a lower bank of advancing rolls, rotatably mounted in vertically spaced relationship on the said supporting frame;
   (6) an upper bank of rotary brushes; and
   (7) a lower bank of rotary brushes rotatably mounted in vertically spaced relationship on the said supporting frame structure;
   (8) the said upper and lower banks of advancing rolls and the said upper and lower banks of rotary brushes being arranged in an arcuate or curved path of travel longitudinally of the said glass washing apparatus from the said feed-in end to the said delivery end of the said supporting frame so that curved glass shapes may be fed through the said glass washing apparatus without fracture of the curved glass shapes under the pressure of the said advancing rolls or of the said rotary brushes as they travel through the said glass washing apparatus from the feed-in end to the said delivery end thereof.

2. Glass washing apparatus as defined in claim 1 in which the radius of curvature of said arcuate or curved path of travel of the said curved glass shapes through the said glass washing apparatus corresponds generally to the radius of curvature of the said curved glass shapes.

3. Glass washing apparatus as defined in claim 1 which includes
   (1) an endless conveyor unit at the feed-in end of the said supporting frame and having an upper run for delivering the curved glass shapes into the curved path of travel between the said advancing rolls and the said rotary brushes; and
   (2) a take-away or delivery conveyor unit at the outlet or delivery end of the said glass washing apparatus and having an upper run for receiving the said curved glass shapes as they are delivered from the said glass washing apparatus; and
   (3) guide means arranged at the feed-in end of the said glass washing apparatus for guiding the upper run of the said endless feed-in conveyor unit in a curved path of travel having a radius corresponding generally to the radius of the curved path of travel of the said curved glass shapes through the said glass washing apparatus.

4. Glass washing apparatus as defined in claim 1 which includes
   (1) an endless conveyor unit at the feed-in end of the said supporting frame and having an upper run for delivering the curved glass shapes into the curved path of travel between the said advancing rolls and the said rotary brushes; and
   (2) a take-away or delivery conveyor unit at the outlet or delivery end of the said glass washing apparatus and having an upper run for receiving the said curved glass shapes as they are delivered from the said glass washing apparatus;
   (3) guide means arranged at the feed-in end of the said glass washing apparatus for guiding the upper run of the said endless feed-in conveyor unit in a curved path of travel having a radius corresponding generally to the radius of the curved path of travel of the said curved glass shapes through the said glass washing apparatus; and
   (4) guide means arranged at the delivery end of the said glass washing apparatus for guiding the upper run of the said endless delivery belt in a curved path of travel having a radius corresponding generally to the radius of the curved path of travel of the said curved glass shapes through the said glass washing apparatus.

5. Glass washing apparatus as defined in claim 1 which includes
   (1) water spray units;
   (2) air blower units; and
   (3) said water spray units and said air blower units being mounted on the said supporting frame on opposite sides of the said arcuate or curved path of travel of the said curved glass shapes through the said glass washing apparatus for washing and drying the said curved glass shapes fed therethrough.

6. Glass washing apparatus as defined in claim 1 which includes
   (1) air blower mounted on a curved or arcuate path opposite sides of the said arcuate or curved path of travel of the said curved glass shapes through the said glass washing apparatus; and in which (2) the radii of the said curved or arcuate path in which the said air drying tubes are mounted corresponds approximately to the radius of the arcuate or curved path of travel of the said curved glass washing apparatus.

References Cited

UNITED STATES PATENTS

| | | | |
|---|---|---|---|
| 2,293,858 | 8/1942 | Schafer | 15—77 |
| 3,304,566 | 2/1967 | Doerschlag | 15—77 |

EDWARD L. ROBERTS, *Primary Examiner.*